United States Patent [19]
Shultz

[11] Patent Number: 6,139,091
[45] Date of Patent: Oct. 31, 2000

[54] LOW PROFILE TRACTOR TRUCK AND TRAILER

[76] Inventor: David M. Shultz, 10 N. Caddo, #160, Cleburne, Tex. 76031

[21] Appl. No.: 09/401,757

[22] Filed: Sep. 23, 1999

Related U.S. Application Data

[60] Provisional application No. 60/101,652, Sep. 23, 1998.

[51] Int. Cl.⁷ .................................................. B60J 7/00
[52] U.S. Cl. .......................................... 296/181; 296/164
[58] Field of Search ..................... 296/181, 182, 296/183, 168, 164, 156, 180.4, 190.01, 190.04, 190.08; 410/29.1

[56] References Cited

U.S. PATENT DOCUMENTS

| | | |
|---|---|---|
| D. 81,186 | 5/1930 | Gund . |
| D. 173,314 | 10/1954 | Kramer . |
| D. 274,322 | 6/1984 | Hayes et al. . |
| 2,694,597 | 11/1954 | Kunz ........................ 410/24.1 |
| 2,974,999 | 3/1961 | Stuart . |
| 3,175,715 | 3/1965 | Smith et al. ............... 296/181 X |
| 3,343,865 | 9/1967 | Stuart ....................... 410/24.1 |
| 3,770,297 | 11/1973 | Quick ....................... 296/164 X |
| 3,929,202 | 12/1975 | Hobbensiefken ........ 296/190.01 X |
| 4,266,823 | 5/1981 | Beler ........................ 296/164 |
| 4,322,108 | 3/1982 | McPherson ............... 296/164 |
| 4,343,506 | 8/1982 | Saltzman .................. 296/183 X |
| 4,351,554 | 9/1982 | Miller ....................... 296/164 X |
| 4,437,699 | 3/1984 | Lewis et al. .............. 296/181 |
| 4,542,933 | 9/1985 | Bischoff ................... 296/164 |
| 4,629,241 | 12/1986 | Gruich . |
| 5,180,205 | 1/1993 | Shoop . |

FOREIGN PATENT DOCUMENTS

| | | | |
|---|---|---|---|
| 560313 | 9/1983 | European Pat. Off. ............. 410/24.1 |
| 2129745 | 9/1993 | United Kingdom .................. 296/181 |

OTHER PUBLICATIONS

Photographs of prior art trucks.

*Primary Examiner*—Joseph D. Pape
*Attorney, Agent, or Firm*—Felsman, Bradley, Vaden, Gunter & Dillon LLP; James E. Bradley

[57] ABSTRACT

A tractor truck and trailer has a very low profile, elongated body and a cab that is less than half as tall as the trailer. The roof of the trailer extends over the cab but is attached to the truck at its rearward end. The truck may be used with any one of a number of specially designed trailers, depending on the type of freight to be shipped. Dry goods can be shipped with a large, hollow rectangular trailer having loading and unloading doors on its front and/or rear end. Live freight is shipped with a similar, perforated trailer having holes all over its body to provide ventilation to the live freight. In addition, a flat bed trailer can be used for bulky freight. Each of trailer versions extend over the top of the cab of the truck to maximize freight capacity while maintaining an overall low profile.

18 Claims, 2 Drawing Sheets

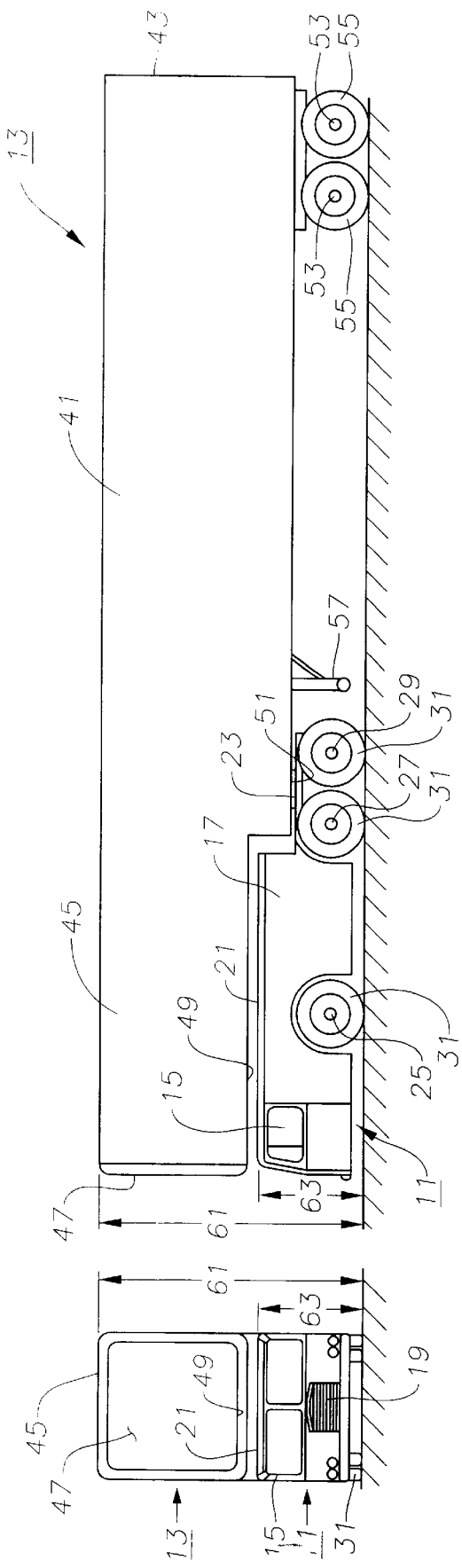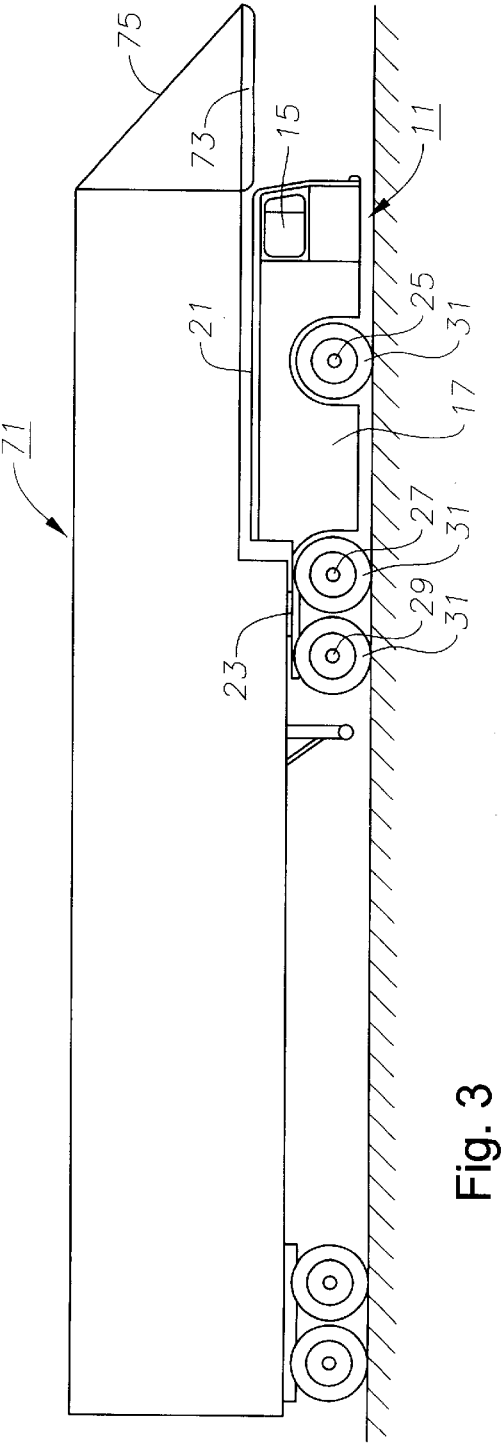

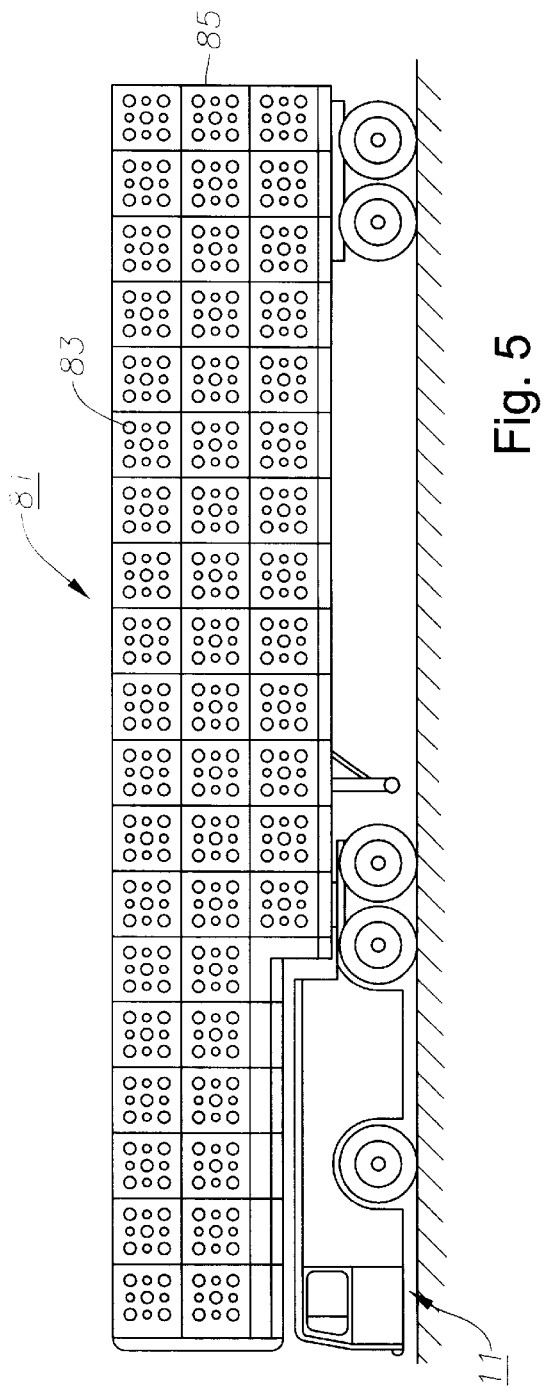
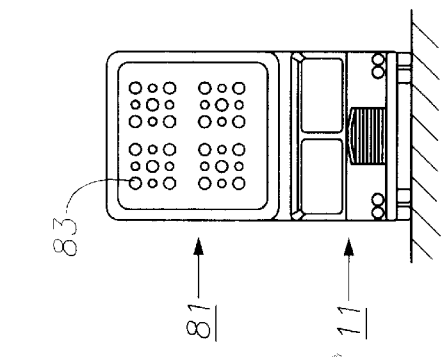
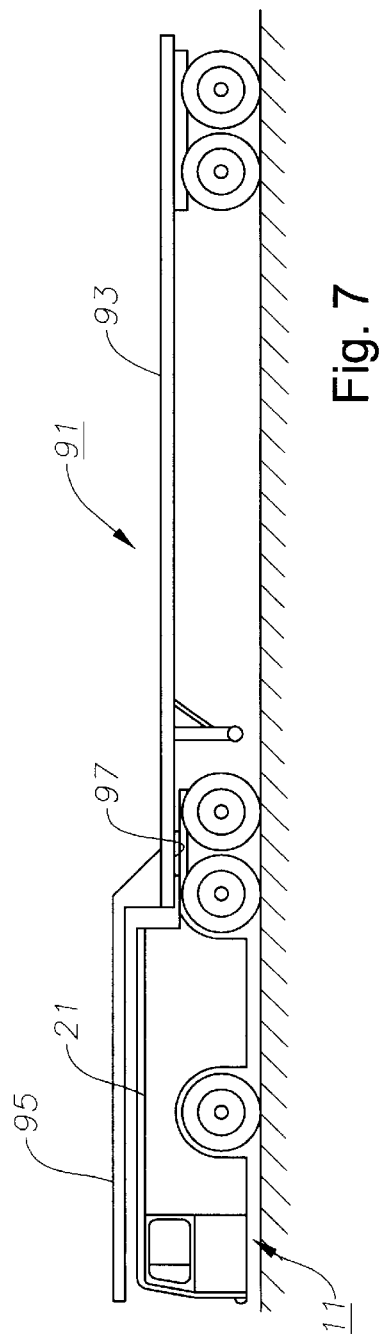
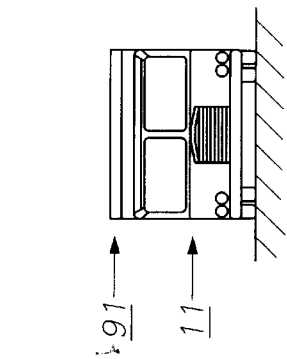

LOW PROFILE TRACTOR TRUCK AND TRAILER

CROSS-REFERENCE TO RELATED APPLICATIONS

This application claims the benefit of U.S. Provisional Application 60/101,652, filed 09/23/98.

TECHNICAL FIELD

This invention relates in general to tractor trucks and trailers and in particular to a low profile tractor truck and trailer for maximizing the shipping volume of the trailer.

BACKGROUND OF THE INVENTION

In the prior art, tractor trucks for hauling freight trailers on roadways typically have a driver/passenger cab and an engine compartment located in front of or below the cab. These designs require the cab to be elevated well above the driving surface in order to accommodate the engine compartment. Despite the elevated cab, a portion of the engine or drivetrain usually extends through the cab toward the rear of the truck.

Because of legal requirements that limit the maximum dimensions for such freight vehicles, the heights of both the truck and the trailer are limited. However, since the cab height often approaches the legal limit, there is very little usable room left above the roof of the truck. Consequently, the front ends of most trailers are located behind the truck and its cab, thereby reducing the usable length of the trailer. This geometry also requires the trailer load hitch to be located very close to the front end of the trailer. Although prior art designs are workable, an improved tractor truck and trailer design for maximizing the volume available for freight is desirable.

SUMMARY OF THE INVENTION

A tractor truck and trailer has a very low profile, elongated body and a cab that is less than half as tall as the trailer. The roof of the trailer extends over the cab but is attached to the truck at its rearward end. The truck may be used with any one of a number of specially designed trailers, depending on the type of freight to be shipped. Dry goods can be shipped with a large, hollow rectangular trailer having loading and unloading doors on its front and/or rear end. Live freight is shipped with a similar, perforated trailer having holes all over its body to provide ventilation to the live freight. In addition, a flat bed trailer can be used for other types of cargo such as bulky freight. Each of trailer versions extend over the top of the cab of the truck to maximize freight capacity while maintaining an overall low profile.

BRIEF DESCRIPTION OF DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1 is a front view of a first embodiment of a tractor truck and trailer constructed in accordance with the invention.

FIG. 2 is a side view of the tractor truck and trailer of FIG. 1.

FIG. 3 is a side view of a second embodiment of the tractor truck and trailer of FIG. 1.

FIG. 4 is a front view of a third embodiment of a tractor truck and trailer of FIG. 1.

FIG. 5 is a side view of the tractor truck and trailer of FIG. 4.

FIG. 6 is a front view of a fourth embodiment of a tractor truck and trailer of FIG. 1.

FIG. 7 is a side view of the tractor truck and trailer of FIG. 6.

BEST MODE FOR CARRYING OUT THE INVENTION

Referring to FIGS. 1 and 2, a tractor truck 11 and trailer 13 for hauling roadway freight are shown. The overall dimensions of tractor truck 11 and trailer 13 are very similar to the overall dimensions of conventional tractor truck/trailer combinations. Tractor truck 11 has a low profile, elongated body with a cab portion 15 located on its forward end. Cab portion 15 is provided for a driver and passenger and may contain internal sleeping accommodations. An engine compartment 17 containing a motor and drivetrain (not shown) for tractor truck 11 is located directly behind cab portion 15. A ventilation and cooling system 19 for engine compartment 17 is located on the front of tractor truck 11, forward of cab portion 15.

Tractor truck 11 has a roof 21 which extends horizontally over cab portion 15 and engine compartment 17. A trailer deck 23 is located at the rearward end of tractor truck 11 and extends from engine compartment 17. Trailer deck 23 is at a lower elevation than roof 21, but is essentially parallel to it. Tractor truck 11 also has a plurality of axles 25, 27, 29. Axle 25 has one tire and wheel assembly 31 on each end while axles 27, 29 each have two tire and wheel assemblies 31 on each end. Axles 27, 29 are located below trailer deck 23.

Tractor truck 11 may be used in conjunction with a number of specially designed trailers, depending on the type of freight to be shipped. Trailer 13 is one such design and is provided for shipping dry goods. Trailer 13 has a long, generally rectangular hollow body 41 which may be loaded from a rearward end 43. Trailer 13 has a forward portion 45 which is contoured to fit closely with the exterior shape of tractor truck 11. Forward portion 45 has a length in the range of 20% to 40% of the total length of the tractor trailer. A front end 47 of forward portion 45 is substantially flush with the front end of tractor truck 11. Forward portion 45 has a raised floor 49 which accommodates roof 21, and a stepped load hitch 51 which is attached to trailer deck 23 and secures trailer 13 to tractor truck 11. Load hitch 51 is a lower elevation than floor 49. The elevation of floor 49 is less than 50% higher than the elevation of the floor of the rearward portion of trailer 13.

Trailer 13 also has a plurality of axles 53 with wheel and tire assemblies 55 near rearward end 43. A stand 57 is located on a lower surface of body 41 near load hitch 51. Stand 57 is generally vertical and is provided for supporting the front half of trailer 13 on a flat surface when trailer 13 is not secured to tractor truck 11.

Trailer 13 has a height 61 which is substantially equal to the heights of conventional trailers. However, tractor truck 11 has a height 63 which is less than one-half of the height 61 of trailer 13 when it is mounted to tractor truck 11. Thus, tractor truck 11 is vertically shorter than conventional tractor trucks. The shape of tractor truck 11 allows forward portion 45 of trailer 13 to extend over roof 21, thereby creating additional shipping volume without significant deviation from the overall dimensions of conventional tractor truck/trailer combinations.

Referring to FIG. 3, a second embodiment of trailer 13 is shown. Trailer 71 is similar to trailer 13, but is designed for front loading through a door 73 located at its forward end. Door 73 is hinged to the front end of trailer 71 along its lower edge. In FIG. 3, door 73 is shown in its open, horizontal position and supported there by a cable 75. When door 73 is in the open position, it extends beyond the front end of tractor truck 11. Door 73 may be pivoted to a closed, vertical position (not shown) after trailer 71 is loaded or unloaded. Trailer 71 is otherwise identical to trailer 13 and incorporates the same features as described above for trailer 13.

Referring now to FIGS. 4 and 5, a third embodiment of trailer 13 is shown. Trailer 81 is similar to trailer 13, but is designed for live freight such as livestock. Trailer 81 has the same overall shape as trailer 11, but is perforated with holes 83 all over its body to provide ventilation to live freight. Trailer 81 is preferably loaded and unloaded at its rearward end 85. Trailer 81 is otherwise identical to trailer 13 and incorporates the same features as described above for trailer 13.

Referring to FIGS. 6 and 7, a fourth embodiment of trailer 13 is shown. Flat bed trailer 91 is similar to trailer 13, but is designed for large bulky or cumbersome freight such as building products. Trailer 91 has a flat bed body 93 and a forward flat bed 95 extending from flat bed body 93. The lower surface of the front end of flat bed body 93 has a load hitch 97 for mounting to trailer deck 23. Forward flat bed 95 extends just above and parallel to roof 21 of tractor truck 11. Trailer 91 is otherwise identical to trailer 13 and incorporates the same features as described above for trailer 13. When loaded with products to a legal height, trailer 91 will have the same height as trailer 13 of FIG. 1. In all of the embodiments, tractor truck 11 is less than one-half of the legal height for conventional tractor trucks.

The invention has advantages. When used in combination with specially designed trailers, the low profile design of the tractor truck of the invention allows the trailer to contain or support a significantly larger cargo.

While the invention has been shown or described in only some of its forms, it should be apparent to those skilled in the art that it is not so limited, but is susceptible to various changes without departing from the scope of the invention.

I claim:

1. A vehicle for transporting freight, comprising:
   a tractor truck having a cab portion on a front end, a trailer deck on a rear end, and an engine compartment located rearward of the cab portion;
   a tractor trailer having a load hitch detachably coupled to the trailer deck of the tractor truck, a forward portion extending over the cab portion of the tractor truck, and a front end on the forward portion that is substantially flush with the front end of the tractor truck; and wherein
   the tractor truck has a roof that extends horizontally over the cab portion and the engine compartment at the same elevation.

2. The vehicle of claim 1 wherein the forward portion of the tractor trailer has a length in the range of 20% to 40% of the total length of the tractor trailer.

3. The vehicle of claim 1 wherein the tractor trailer has a generally rectangular hollow body with a roof extending from a rearward end to the front end that is flat and at the same elevation along its entire length.

4. A vehicle for transporting freight, comprising:
   a tractor truck having a cab portion on a front end, a trailer deck on a rear end, and an engine compartment located rearward of the cab portion;
   a tractor trailer having a load hitch detachably coupled to the trailer deck of the tractor truck, a forward portion extending over the cab portion of the tractor truck, and a front end on the forward portion that is substantially flush with the front end of the tractor truck; and wherein
   the front end of tractor trailer has a front door facing forward from the forward portion for providing access to an interior of the tractor trailer.

5. A vehicle for transporting freight, comprising:
   a tractor truck having a cab portion on a front end, a trailer deck on a rear end, and an engine compartment located rearward of the cab portion;
   a tractor trailer having a load hitch detachably coupled to the trailer deck of the tractor truck, a forward portion extending over the cab portion of the tractor truck, and a front end on the forward portion that is substantially flush with the front end of the tractor truck; and wherein
   the tractor trailer has a roof and side walls defining a container, and wherein the tractor truck has a height that is less than half the height of the tractor trailer.

6. The vehicle of claim 5 wherein the tractor trailer has side walls that are perforated with holes substantially throughout to provide ventilation to live freight, the side walls extending from a rearward end to the front end.

7. A vehicle for transporting freight, comprising:
   a tractor truck having a cab portion on a front end, a trailer deck on a rear end, and an engine compartment located rearward of the cab portion;
   a tractor trailer having a load hitch detachably coupled to the trailer deck of the tractor truck, a forward portion extending over the cab portion of the tractor truck, and a front end on the forward portion that is substantially flush with the front end of the tractor truck; and wherein
   the tractor trailer is a flat bed trailer with a first platform defined by the forward portion, and a second platform extending rearward from the forward portion that is at a lower elevation than the first platform.

8. A vehicle for transporting freight, comprising:
   a tractor truck having a cab portion on a front end, a trailer deck on a rear end, and an engine compartment located rearward of the cab portion;
   a tractor trailer having a load hitch detachably coupled to the trailer deck of the tractor truck, a forward portion extending over the cab portion of the tractor truck, and a front end on the forward portion that is substantially flush with the front end of the tractor truck; and
   wherein the tractor truck has a height that is less than half of a height of the tractor trailer.

9. A vehicle for transporting freight, comprising:
   a tractor truck having a front end, a cab portion with a roof, a trailer deck on a rear end, an engine compartment located behind the cab portion, and wherein the roof extends horizontally over the cab portion and the engine compartment at substantially the same elevation;
   a tractor trailer having a load hitch detachably coupled to the trailer deck of the tractor truck, a forward portion with a floor extending over the roof of the tractor truck at a first elevation, a front end on the forward portion that is substantially flush with the front end of the tractor truck, a rearward portion having a floor extending rearward from the forward portion at a second elevation, wherein the first elevation is less than 50% higher than the second elevation; and wherein the forward portion of the tractor trailer has a length in the range of 20 to 40% of the total length of the tractor trailer.

10. The vehicle of claim 9 wherein the front end of tractor trailer has a front door facing forward from the forward portion for providing access to an interior of the forward portion.

11. The vehicle of claim 9 wherein the tractor trailer has a roof and side walls defining a container, and wherein the tractor truck has an overall height that is less than half the overall height of the tractor trailer.

12. The vehicle of claim 9 wherein the tractor trailer has a generally rectangular hollow body with a roof extending from a rearward end to the front end that is flat and at the same elevation along its entire length.

13. The vehicle of claim 9 wherein the tractor trailer has side walls that are perforated with holes substantially throughout to provide ventilation to live freight, the side walls extending from a rearward end to the front end.

14. The vehicle of claim 9 wherein the tractor trailer is a flat bed trailer with first and second platforms defined by the forward and rearward portions, respectively.

15. The vehicle of claim 9 wherein the tractor truck has an overall height that is less than half the overall height of the tractor trailer.

16. A vehicle for transporting freight, comprising:

a tractor truck having a front end, a cab portion with a roof, a trailer deck on a rear end, an engine compartment located behind the cab portion, and wherein the roof extends horizontally over the cab portion and the engine compartment at substantially the same elevation;

a a tractor trailer having a load hitch detachably coupled to the trailer deck of the tractor truck, a generally rectangular hollow body with a front end that is substantially flush with the front end of the tractor truck, a rear end, a roof, and side walls extending therebetween, the roof being substantially flat and at a consistent elevation, the body having a forward portion with a floor extending over the roof of the tractor truck at a first elevation, and a rearward portion extending rearward from the forward portion at a second elevation, wherein the first elevation of the tractor trailer is less than 50% higher than the second elevation; and wherein the forward portion has a length in the range of 20 to 40% of the total length of the tractor trailer, and the tractor truck has an overall height that is less than half of an overall height of the tractor trailer.

17. The vehicle of claim 16 wherein the front end of tractor trailer has a front door facing forward from the forward portion for providing access to an interior of the forward portion.

18. The vehicle of claim 16 wherein the side walls of the tractor trailer are perforated with holes to provide ventilation to live freight.

* * * * *